United States Patent [19]

Hunt

[11] 4,215,756

[45] Aug. 5, 1980

[54] APPARATUS FOR PREVENTING DAMAGE TO THE FLEXIBLE SKIRT OF AN AIR CUSHION VEHICLE, BY ICE

[75] Inventor: Rowland D. Hunt, Calgary, Canada

[73] Assignee: Hoverlift Systems Ltd., Calgary, Canada

[21] Appl. No.: 926,851

[22] Filed: Jul. 21, 1978

[51] Int. Cl.$^2$ .............................. B60V 1/16; B60V 1/18
[52] U.S. Cl. ................................... 180/127; 114/40;
114/67 A; 114/219
[58] Field of Search ................ 180/116, 127; 114/219,
114/40, 41, 42, 67 R, 67 A; 293/122, 102

[56] References Cited

U.S. PATENT DOCUMENTS

| 2,517,978 | 8/1950 | Collier | 114/41 |
| 3,228,294 | 1/1966 | Hickman | 180/116 X |
| 3,268,022 | 8/1966 | Gustafson | 180/116 |
| 3,561,558 | 2/1971 | Parkhouse | 180/116 X |
| 4,018,466 | 4/1977 | Norlin | 293/122 |

*Primary Examiner*—John P. Silverstrim
*Attorney, Agent, or Firm*—Sidney T. Jelly

[57] ABSTRACT

An air cushion vehicle has a plurality of webs extending out between adjacent skirt members, with a solid or tubular peripheral member attached to the web members at their forward parts. The web members and the peripheral member guard the skirt against damage by debris, such as ice. The webs tend to ride up over an ice edge, while ice floes or similar objects are deflected by the peripheral member. The peripheral member can be in the form of a blade to cut off humps of ice on the top of an ice sheet or floe.

10 Claims, 6 Drawing Figures

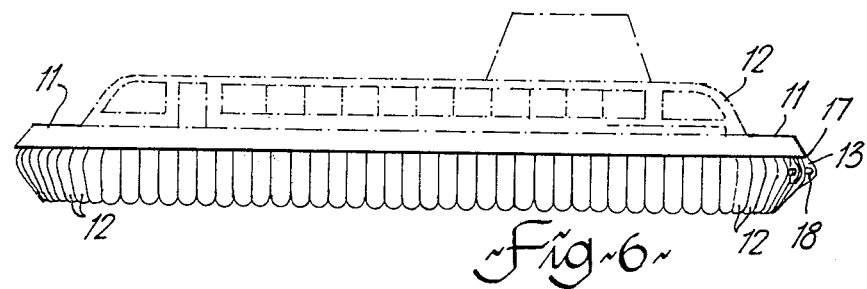
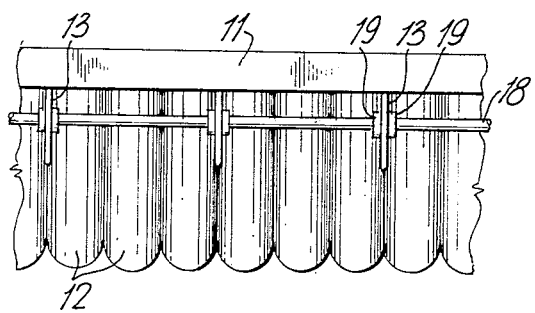
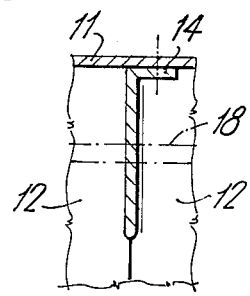
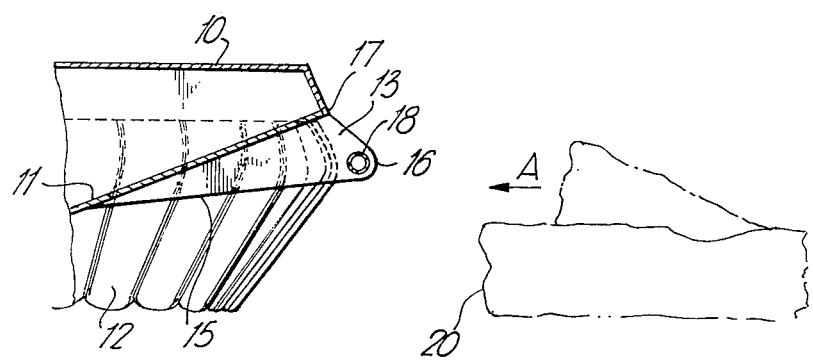
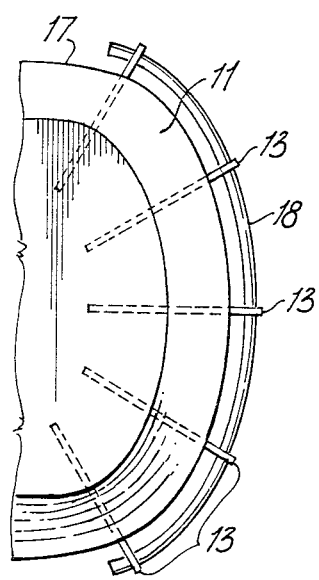
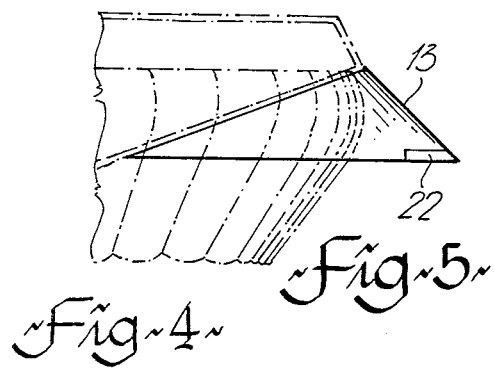

APPARATUS FOR PREVENTING DAMAGE TO THE FLEXIBLE SKIRT OF AN AIR CUSHION VEHICLE, BY ICE

This invention relates to apparatus for preventing, or at least substantially reducing, damage to the flexible skirt of an air cushion vehicle, such as by ice, when the vehicle is operating over water on which there is floating ice, or by other floating debris.

Conditions in which broken ice is floating on water can occur, for example, where the ice is breaking up at the end of winter, or when broken ice has been carried down from some other source. Broken ice can also occur when an ice breaker is being used to provide a passage through the ice. The invention is also applicable when the vehicle meets an ice edge, for example a large unbroken area of ice, or a large ice floe. It is also possible that other obstacles, such as logs, could cause damage.

In the broadest aspect the invention provides a series of vertically oriented webs or vanes extending from the periphery of the hull, the webs connected at their outward ends by one or more members extending generally parallel to, and external to, the vehicle periphery. The webs may extend for only part of the periphery of the vehicle, for example at the front. Generally the webs will extend in a fore and aft direction, that is in a direction parallel to the fore and aft axis of the vehicle, but they may be arranged at an angular disposition to the vehicle fore and aft axis.

The invention will be understood by the following description of an embodiment, by way of example, in conjunction with the accompanying drawings, in which:

FIG. 1 is a vertical cross-section through the periphery of a vehicle, illustrating the invention;

FIG. 2 is a view in the direction of arrow A in FIG. 1;

FIG. 3 is a cross-section on the line III-III of FIG. 1;

FIG. 4 is a plan view of part of the periphery of the vehicle as in FIG. 1;

FIG. 5 is a view similar to that of FIG. 1 illustrating an alternative form;

FIG. 6 is a side view of one form of vehicle embodying the invention.

The vehicle illustrated comprises a hull 10 having an upwardly and outwardly inclined bottom peripheral surface 11. To the inclined surface 11 are attached a plurality of flexible skirt members 12, for example as described in Canadian Pat. No. 795,661, issued Oct. 1, 1968. The method of attachment of the skirt members can vary and is no part of the present invention. Attached to the inclined surface 11 is a number of rigid vertical webs or vanes 13. The number of webs provided can be varied. Often only two or three each side of the vehicle fore and aft centre line are sufficient, but more, or less, can be provided, as desired.

The webs 13 are relatively thin metal and can be attached to the inclined surface 11 by a flanged portion 14 extending along its upper edge, as illustrated in FIG. 3, or alternatively separate members such as brackets can be used.

Each web 13 is of a generally triangular form with its bottom edge 15 also inclined upwardly and outwardly. This prevents the webs 13 contacting the surface when the vehicle settle down in the "off cushion" condition, that is when the supporting air cushion is not in being. The forward end 16 of each web extends outwards beyond the periphery 17 of the hull 10, and also beyond the periphery extent of the skirt 12. Extending between the ends 16 of the webs 13 is a rigid member 18.

The member 18 can vary is its form and in the way it is attached to the webs 13. Thus, the member can be composed of a member of separate short lengths, a length between each adjacent pair of webs 13. The lengths can be welded at each end to the webs, or for example, sockets, indicated at 19 in FIGS. 1 and 2, can be attached to each side of a web and the ends of the lengths of the member inserted into the sockets prior to attachment of the webs to the hull. A further alternative is to manufacture the member 13 to its final form as a single length. Holes slightly larger than the size of the member 18 are formed in the ends of the webs, and the webs pushed onto the member before attached to the hull. Tubular strengthening members, similar to the sockets 19, can be provided on one side or both sides of the webs.

The cross-section of the member 18 can vary but conveniently is circular. Also member 18 is conveniently of tubular form, but a solid member can be used. The webs 13 and member 18 are usually of metal.

Depending upon operational requirements and conditions, the length of periphery over which the member 18 extends can vary. Also, as stated, the number, and spacing, of the webs can vary. Generally it will be sufficient for webs and member to extend for the front of the vehicle, as in FIGS. 4 and 5. This would be satisfactory for a vehicle which meets ice such that relative movement between ice and vehicle is substantially in a direction parallel to the fore and aft axis of the vehicle. For a vehicle which could encounter ice moving in a direction normal to the vehicle fore and aft axis, webs 13 and member 18 would extend along the side of a vehicle. Such an operational condition could occur in a ferry or similar vehicle operating across a river, ice floating down the river. Further, a combination of both these ice conditions could occur and then webs and member could be provided for different parts of the vehicle periphery, or even for the entire periphery.

The webs 13 and member 18 act in two ways. When a vehicle encounters an ice edge, for example a continuous ice sheet or large floe, the webs 13 will tend to ride up over the edge, avoiding or at least reducing impact between ice edge and skirt segments 12. Such an ice edge is indicated at 20 in FIG. 1. When tipped-up ice ledges are encountered, the member 18 acts as a bumper bar and deflects the ice ledges before they hit the upper portions of the skirt segments 12. These upper portions of the skirt segments are resistant to flexing and therefore are more vulnerable than the lower portions. Similarly, for other objects, the member 18 acts as a bumper bar and deflects them before they hit the skirt.

It is possible that when a vehicle is operating in conditions such that it will encounter ice-edges, or very large floes, that there will be humps or ridges of ice on top of the ice sheet. In such instances contact would occur between the ice hump and vehicle body unless the skirt height were to be increased. However, particularly for relatively small vehicles, it may not be acceptable to increase the skirt height sufficiently. In an alternate embodiment of the invention, the peripheral member 18 can be in the form of a flat blade at the extremity of the webs 13. Such an arrangement is illustrated in FIG. 5. Instead of a tubular or similar member, as at 18 in FIG. 1, a blade member 22 is provided at the outer ends of the webs 13. The blade member 22 can be in short lengths, a length between each adjacent pair of webs, or a continuous blade can extend over several webs. It can be inset into the webs, as shown, or attached in other positions, for example below, as by welding to the bottom edges of the webs.

The blade member 22 will still act in the same manner as member 18 when meeting tipped-up ledges and other obstacles. When meeting humps or ridges, the blade member will shear them off. Preferably, the blade member 22 is positioned at substantially the same level as the bottom surface of the hand structure of the vehicle.

In FIG. 6 is illustrated the hull 10, and superstructure 25 which can house the lift fan power plant and other equipment. Propulsion of the vehicle can vary, depending upon operational requirements. Thus air propellors, with engines, can be mounted on the superstructure 25. Air can be expelled from controllable ports in the sides and ends of the superstructure, or the vehicle can be towed or pushed or otherwise moved. By a vehicle is meant any form of load carrying device supported over a surface. The air cushion may be formed under the whole, or part of the vehicle body.

What is claimed is:

1. In an air cushion vehicle including a hull having a peripheral bottom surface and a plurality of adjacent flexible skirt members attached to said surface, the improvement comprising apparatus for protecting said skirt members, said apparatus comprising: a plurality of rigid, vertically oriented web members, each of said web members having a rearward portion extending in between adjacent ones of said skirt members for attachment to said surface and a forward portion extending beyond the outer periphery of said skirt members; and means for rigidly interconnecting said forward portions, said interconnecting means being spaced from said outer periphery of said skirt members.

2. An air cushion vehicle as claimed in claim 1, said means for rigidly interconnecting said forward portions extending for a front portion of the vehicle.

3. Apparatus as claimed in claim 1, said vehicle having an upwardly and outwardly inclined bottom peripheral surface, said rearward portion of each web member extending under said inclined bottom peripheral surface.

4. Apparatus as claimed in claim 3, said rearward portions at said web members being tapered and extending beneath said inclined bottom peripheral surface, whereby said webs are not in contact with a firm surface when said vehicle is not supported by the air cushion.

5. Apparatus as claimed in claim 3, said web members attached to said inclined bottom peripheral surface.

6. Apparatus as claimed in claim 1, said means for rigidly interconnecting said forward portions comprising a peripherally extending member having a plurality of sections, a section extending between adjacent ones of said web members.

7. Apparatus as claimed in claim 1, said means for rigidly interconnecting said forward portions comprising a continuous peripherally extending member extending through an aperture in the forward portion of each web member.

8. Apparatus as claimed in claim 1, said means for rigidly interconnecting said forward portions comprising a peripherally extending member of tubular form.

9. Apparatus as claimed in claim 1, said means for rigidly interconnecting said forward portions comprising a peripherally extending blade member attached to the forward portions of said web members.

10. Apparatus as claimed in claim 1, said skirt comprising a plurality of segments extending side-by-side for at least part of the periphery of the vehicle, a plurality of skirt members positioned between each pair of web members.

* * * * *